(12) United States Patent
McBrien et al.

(10) Patent No.: US 12,473,859 B1
(45) Date of Patent: Nov. 18, 2025

(54) METHOD AND SYSTEM FOR COOLING OF ENGINE MOUNTED COMPONENTS

(71) Applicant: Hamilton Sundstrand Corporation, Charlotte, NC (US)

(72) Inventors: Gary McBrien, Glastonbury, CT (US); Leo Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/762,161

(22) Filed: Jul. 2, 2024

(51) Int. Cl.
| | |
|---|---|
| *F02C 7/224* | (2006.01) |
| *F02C 7/14* | (2006.01) |
| *F02C 7/16* | (2006.01) |
| *F02C 7/232* | (2006.01) |
| *F02C 7/236* | (2006.01) |

(52) U.S. Cl.
CPC ............... *F02C 7/224* (2013.01); *F02C 7/14* (2013.01); *F02C 7/16* (2013.01); *F02C 7/232* (2013.01); *F02C 7/236* (2013.01)

(58) Field of Classification Search
CPC .... F02C 7/224; F02C 7/14; F02C 7/16; F02C 7/232; F02C 7/236; F16K 31/002; F16K 99/0036; F04B 23/04; F04D 29/5813; F01P 2003/005
See application file for complete search history.

(56) References Cited

U.S. PATENT DOCUMENTS

| | | | |
|---|---|---|---|
| 3,052,095 A | 9/1962 | Prachar | |
| 8,424,285 B2 * | 4/2013 | Veilleux, Jr. | F02C 7/12 60/39.83 |
| 9,394,832 B2 * | 7/2016 | Aurousseau | F02C 7/275 |
| 10,526,971 B2 * | 1/2020 | Mastrocola | F02C 7/14 |
| 2008/0055852 A1 * | 3/2008 | Uluc | H05K 7/20218 361/699 |
| 2008/0110593 A1 * | 5/2008 | Coney | F01D 25/12 165/80.2 |
| 2010/0242492 A1 * | 9/2010 | Sloat | F02K 3/105 60/39.83 |
| 2013/0283811 A1 * | 10/2013 | Potel | F02C 7/224 60/734 |
| 2019/0218971 A1 | 7/2019 | Niergarth et al. | |
| 2020/0025081 A1 * | 1/2020 | Dyer | F02C 7/236 |
| 2020/0123964 A1 | 4/2020 | Julien et al. | |
| 2020/0332714 A1 * | 10/2020 | Ribarov | F02C 7/22 |
| 2020/0332716 A1 * | 10/2020 | Ribarov | F02C 7/224 |
| 2021/0229827 A1 | 7/2021 | Doman | |
| 2021/0305674 A1 * | 9/2021 | Rhoden | H01Q 21/0025 |
| 2024/0011417 A1 | 1/2024 | Sibbach et al. | |

* cited by examiner

*Primary Examiner* — Devon C Kramer
*Assistant Examiner* — Jingchen Liu
(74) *Attorney, Agent, or Firm* — Kinney & Lange, P.A.

(57) ABSTRACT

A cooling system includes a fuel supply system and a cooling fuel path. The fuel supply system includes a boost stage pump and a main stage pump, while the cooling fuel path includes a fuel bleed from an outlet of the boost stage pump, a fuel return to an inlet of the boost stage pump, and a cooler disposed fluidly between the fuel bleed and the fuel return.

16 Claims, 5 Drawing Sheets

METHOD AND SYSTEM FOR COOLING OF ENGINE MOUNTED COMPONENTS

BACKGROUND

The present invention relates generally to cooling systems, and more particularly to fuel-based cooling methods and architectures for hot gas turbine engine locations.

It is often necessary or advantageous to mount certain electronics and other heat-sensitive components at or near hot locations on gas turbine engines. Situating components such as exciters and controllers in hot locations, near where they are needed, can reduce overall engine weight and complexity and facilitate rapid and accurate engine control. More generally, it is not always feasible to house heat-sensitive components in cooler engine locations. Specialized cooling solutions are therefore needed for heat-sensitive components.

SUMMARY

In one aspect, this disclosure presents a cooling system for a gas turbine engine. This cooling system includes a fuel supply system and a cooling fuel path. The fuel supply system includes a boost stage pump and a main stage pump, while the cooling fuel path includes a fuel bleed from an outlet of the boost stage pump, a fuel return to an inlet of the boost stage pump, and a cooler disposed fluidly between the fuel bleed and the fuel return.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents cooling systems and approaches for use in hot environments of a gas turbine engine. These approaches cool heat-sensitive components such as exciters and control electronics using cooling plates, integral cooling channels, or other fluid cooling elements (coolers) cooled by fuel bled from an output of a boost stage pump (referred to hereinafter generally as "cooling plates"), and returned upstream of the boost stage pump. Advantageously, this provides increased cooling flow (i.e., due to increased boost stage pump speed) at higher engine speeds corresponding to hotter engine temperatures. These cooling plates can be situated to as to serve as both heat sinks and a thermal barriers between hot engine sections and heat-sensitive components.

In some of the embodiments discussed below, cooling fuel flow to cooling plates can be controlled by a thermal valve to receive cooling fluid from a location downstream of an existing fuel filter so as to reduce debris at the cooling plate, so long as fuel temperature from this location is sufficiently low. Where fuel downstream of this filter may be too hot to provide adequate cooling to heat-sensitive components, the thermal valve can instead draw fuel directly from the boost stage pump output bleed, as noted above.

Figure 1A:
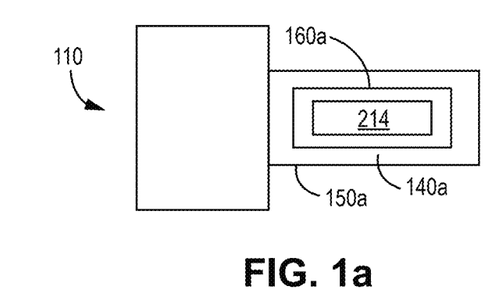
FIGS. 1a, 1b, and 1c are schematic illustrations of example hot engine environments.
Figure 1B:
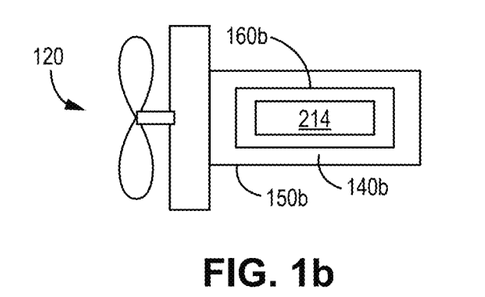
Figure 1C:
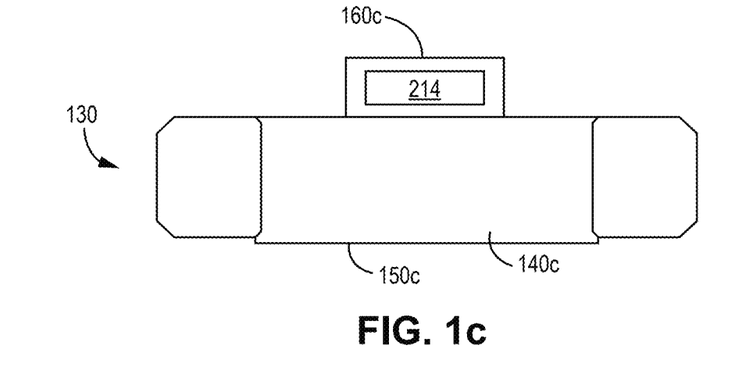

FIGS. 1a, 1b, and 1c are simplified schematic illustrations of various gas turbine engine systems, and are discussed together. FIG. 1a provides a simplified schematic illustration of turbofan 110, FIG. 1b of turboprop 120, and FIG. 1c of turbojet 130. Engines 110-130 are provided by way of example, as illustrative systems in which cooling as described in detail below is both available and needed.

All engines 110-130 receive and compress atmospheric air, and combust mixtures of fuel and compressed air to drive turbines via Brayton cycle mechanics as will be well understood by those familiar with gas turbine engine operation. Hot engine locations 140a-c (generally, hot locations 140) are regions of engines 110-130, respectively, that are near a combustor, high-pressure turbine, or other engine section expected to be subjected to high operating temperatures. Hot cases 150a-c (generally, hot case 150) is a section or area of engine case near and heated by a corresponding hot location 140.

It can be necessary or preferable to locate some heat-sensitive devices, particularly electronics such as exciters and/or engine controllers, on hot case 150 or otherwise near hot location 140. More specifically, some components either must be situated in hot regions to perform their expected functions, or must be connected in to hot regions (e.g., by electrical leads, mechanical attachments, or probes), such that housing these components in cooler locations more remote from hot region 140 would add considerable weight and/or complexity to engine 110/120/130. For this reason, engines 110/120/130 are provided with cooling plates 160a-c (generally, cooling plates 160) to maintain heat-sensitive component 214 (discussed below with reference to FIGS. 2 and 3) at acceptable temperatures in locations on hot case 150 or otherwise in or near hot region 140. As noted above, although this specification describes focuses on cooling using cooling plates, integral cooling channels (i.e., in or through heat-sensitive component 214) and other means of fluid cooling can equivalently be substituted for cooling plates 160.

Cooling plates 160 are fluidly-cooled heat exchanger elements supplied with cooling flows of fuel, as described in detail and in various embodiments below. Cooling plates 160 can directly abut heat-sensitive components for conductive cooling thereof, and/or can be indirectly thermally connected to such components, e.g. by intervening heat pipe plates, or thermal connectors. In general, heat-sensitive components such as circuit boards and other electronics can be mounted on cooling plates 160 as known generally in the art for heat dissipation and shielding. In some examples, cooling plates 160 can also be disposed between heat-sensitive components and hot case 150 and/or hot region 140 to serve as a thermal barrier between such components and engine heat. Cooling plates 160 include channels or passages for cooling fuel flow. In some examples, as understood in the art, surface area for heat exchange can be increased by making these passages tortuous, or by adding ridges or fins to promote heat transfer.

Although cooling plates 160a-c have been described above with respect to engines 110-130, the cooling approaches set forth in the following figures can be advantageously applied to any fuel-based cooling approach to heat management in or near a hot region of a gas turbine engine.

Figure 2:
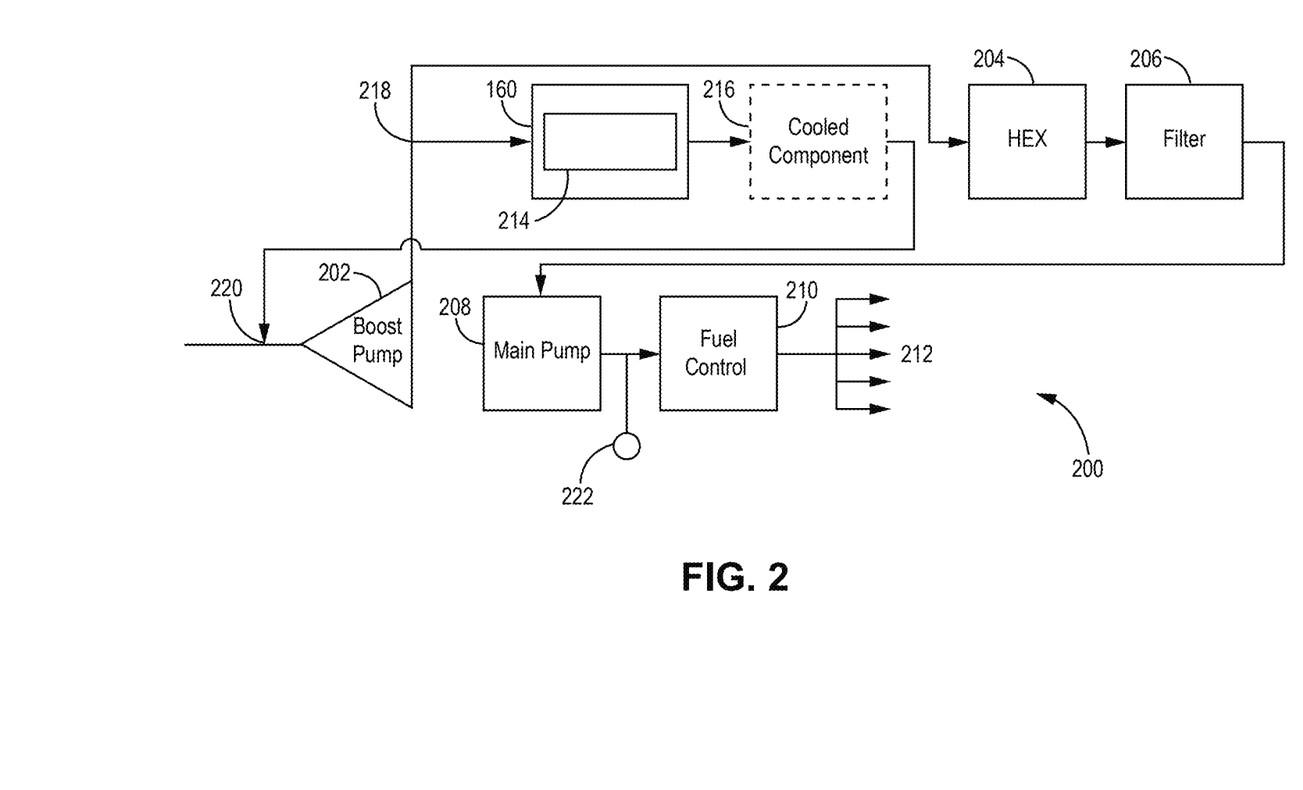
FIG. 2 is a flow diagram of a cooling scheme for use in a hot engine environment as illustrated in FIGS. 1a, 1b, and/or 1c.

FIG. 2 is a simplified flow diagram of a cooling system 200, and illustrates a scheme for handling fuel as cooling fluid to cooling plate 160. Cooling system 200 includes cooling plate 160 (or equivalent fuel cooling structure), boost stage pump 202, heat exchanger 204, filter 206, main stage pump 208, fuel control 210 (to injectors 212), heat-sensitive component 214, an optional additional cooled component 216, fuel bleed 218, fuel return 220, and temperature sensor 222. System 200 uses fuel, which is present and available as a cooling source within engines 110-130, as a cooling fluid. More specifically, fuel for cooling is taken at a boost stage pressure from a boost stage pump, e.g., at a location between a fuel tank and downstream components. Boost stage pressure is sufficiently high to provide cooling flow, but low compared to main engine fuel pressures, reducing likelihood and potential severity of leakage in cooling lines. Boost stage fuel is typically the coolest fuel already available within engines 110/120/130.

In flow series, boost stage pump 202, heat exchanger, 204, filter 206, main stage pump 208, fuel control 210, and injectors 212 together make up a fuel supply system to maintain metered and otherwise controlled fuel flow to a combustor of engine 110/120/130. Main stage pump 208 pressurizes fuel to a pressure required for injection, but can require a minimum inlet (fuel) pressure to function. Filter 206 catches particles in fuel flow upstream of boost stage pump 202, preventing damage, deterioration, and other impairment. Boost stage pump 202 provides pre-pressurization or boost pressure required to meet the minimum inlet pressure of main stage pump 208, and to carry fuel through filter 206 and heat exchanger 204. Boost stage pump 202 can, for example, be a centrifugal pump having a pump speed tied (e.g., mechanically) to overall engine speed, as explained below with reference to FIG. 5. In many embodiments, boost stage pump 202 can be start immediate upon engine startup, creating a differential boost pressure of 100-200 PSI. Boost pressure maintained by boost stage pump 202 can, for example, prevent cavitation in fuel flow to main stage pump 208 and otherwise facilitate operation of main stage pump 208, which may in some embodiments be required to reach pressures of 1500-2000 PSI or more.

Some embodiments of system 200 can include heat exchanger 204, a cooling mechanism distinct from cooling plate 160 and disposed statically between boost stage pump 202 and main stage pump 208. Like cooling plate 160, heat exchanger 204 provides cooling to heat-sensitive components by shunting heat into fuel between boost stage pump 202 and main stage pump 208. Although heat exchanger 204 can be disposed upstream of filter 206, as shown, other embodiments of system 200 can include heat exchangers additionally or alternatively disposed downstream of filter 206, e.g., where the removal of particulate matter from fuel flow upstream of heat exchanger 204 is desirable. The dumping of heat by heat exchanger 204 into fuel for combustion can, in some embodiments, be a means of advantageously pre-heating fuel prior to injection and combustion.

System 200 includes an additional cooling fuel path consisting of, in flow series, fuel bleed 218, cooling plate 160, additional cooled component 216, and fuel return 220. As noted above, cooling plate 160 is a fuel-cooled heat exchanger (and, in some embodiments, heat shield) disposed to protect a heat-sensitive component 214 from heat in or near hot region 140. Heat-sensitive component 214 can, for example, be an exciter configured to discharge into igniter sparkplugs, and to charge a power storage unit using engine power. In other embodiments, heat-sensitive component 214 can, for example, be a logic capable controller such as a full authority digital engine controller (FADEC). In the most general case, however, heat-sensitive component 214 can be any component advantageously positioned close to hot region 140 but intolerant of the high temperatures in and near hot region 140. In some embodiments, cooling plate 160 or equivalent hardware can be a part of heat-sensitive component 214.

In some modes (for other modes, see FIG. 3 and accompanying description, below) cooling plate 160 receives relatively cool fuel (e.g. at temperatures below 135° F.) from an output of boost stage pump 202 via fuel bleed 218 like and in parallel with heat exchanger 204. Fuel exiting cooling plate 160, however, is returned to or upstream of boost stage pump 202, not sent to (i.e., via filter 206) to main stage pump 208.

System 200 advantageously provides fuel as a cooling flow to cooling plate 160 throughout operation of engine 110/120/130 due to substantially continuous operation of boost stage pump 202. Moreover, since speed of boost stage pump 202 increases as a function of engine speed, cooling flow provided by boost stage pump 202 to cooling plate 160 naturally increases alongside engine temperature, matching need.

FIG. 2 also illustrates cooled component 216, an optional additional component disposed downstream of cooling plate 160. Cooled component 216 can be a further heat-sensitive component as described above with respect to heat-sensitive component 214, and can be cooled by a corresponding cooling plate analogous to cooling plate 160. More generally, however, additional cooled component 216 represents any additional element receiving fuel as cooling fluid in series with cooling plate 160. Although cooling plate 160 is illustrated upstream of additional cooled component 216, The most general embodiments of system 200 can include any functional number of separately identifiable components for cooling, which can be arranged in any order, and/or in parallel. In general, components with lower cooling requirements (i.e., higher operational temperatures) and/or that generate more heat are preferably located downstream of components with higher cooling requirements (i.e., lower operational temperatures) and/or that generate less heat.

Figure 3:
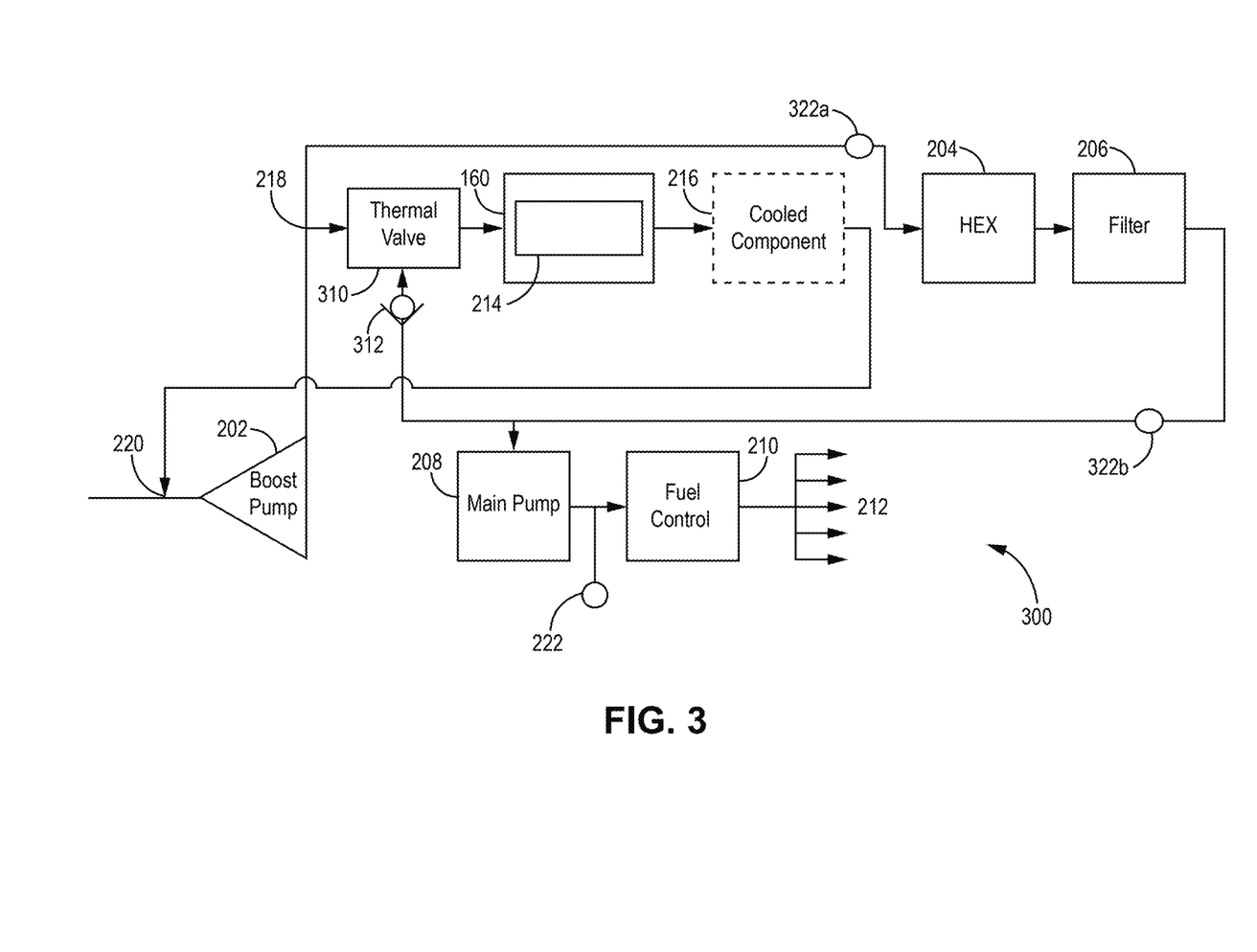
FIG. 3 is a flow diagram of an alternative cooling scheme to the approach of FIG. 2 incorporating a thermal valve.

FIG. 3 is a simplified flow diagram of cooling system 300, illustrating an alternative cooling scheme to the approach described above with reference to FIG. 2. FIG. 3 differs from FIG. 2 principally by the addition of thermal valve 310 and related components. Cooling system 300 includes all components of cooling system 200, which operate as described above with reference to FIG. 2 except where otherwise noted below.

Thermal valve 310 is a valve actuatable between at least two states. Thermal valve 310 can, for example, be a 3-way valve with a single outlet to cooling plate 160 fluidly connectable to receive fuel either from fuel bleed 218 (i.e., such that cooling plate 160 is cooled in partial parallel with heat exchanger 204) or from downstream of heat exchanger 204 (and optionally filter 206). In the illustrated embodiment, an exit of filter 206 is fluidly connected to inlets of both main stage pump 208 and thermal valve 310, with a check valve 312 provided en route to thermal valve 310 to prevent fuel flow through thermal valve 310 to main stage pump 208 that could otherwise bypass heat exchanger 204 and filter 206. Check valve 312 can be any suitable sort of backflow-prevention valve, such as a ball, swing, or lift check valve.

Figure 4A:
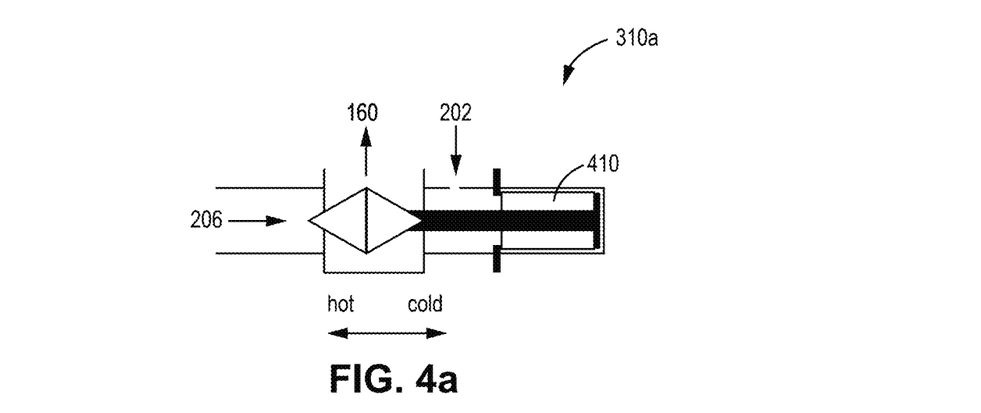
FIGS. 4a, 4b, and 4c are schematic illustrations of alternative version of the thermal valve of FIG. 3.
Figure 4B:
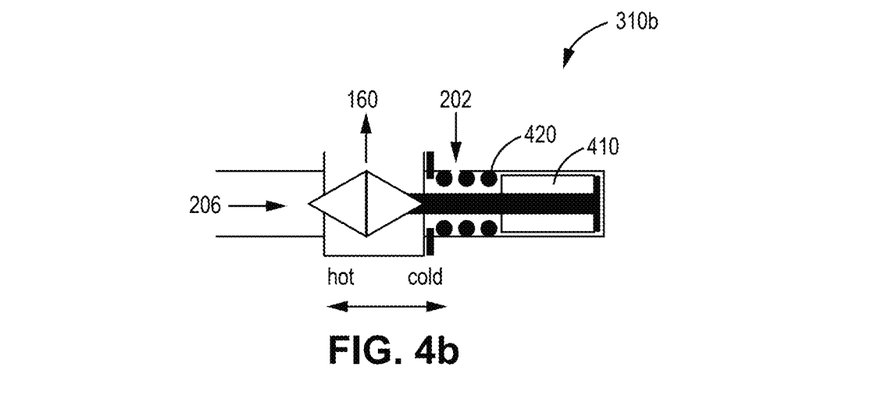
Figure 4C:
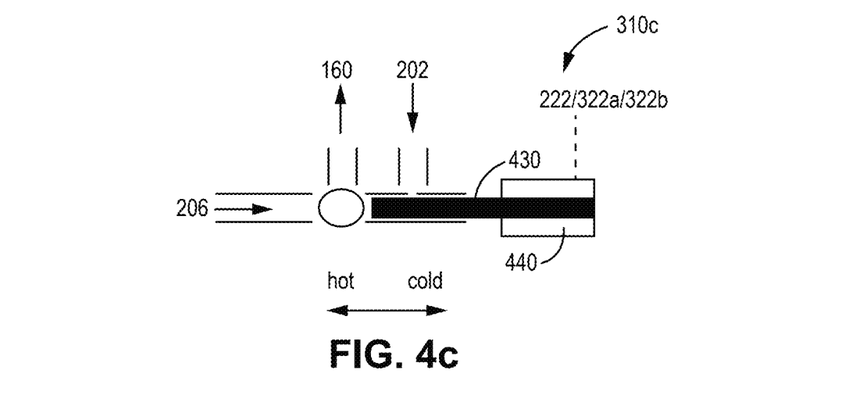

Thermal valve 310 enables system 300 to selectively route fuel through cooling plate 160 either from downstream of heat exchanger 204 (and filter 206), or from further upstream, at fuel bleed 218. Thermal valve 310 can actuate between these two modes on the basis of fuel temperature. FIGS. 4a-c present different versions of thermal valve 310, identified as thermal valves 310a-c, respectively. Control schemes for system 300 using different configurations of thermal valve 310 are described with reference to FIG. 3 and FIGS. 4a-c, together.

Thermal valve 310 switches modes based on fuel temperature, as noted above. In some embodiments this fuel temperature can be a temperature at thermal valve 310, e.g., of fuel immediately downstream of fuel bleed 218 or heat exchanger 204. In such embodiments, as illustrated in FIGS. 4a and 4b, thermal valve 310 can be a passively reactive valve, or a partially passive valve, with internal mechanisms responsive to changes in local fuel temperature. Passively temperature-responsive elements of thermal valve 310 can, for example, include thermal displacement mechanisms such as thermal wax cells or bags 410, bimetal disk stacks formed of materials having different coefficients of thermal expansion (CTE), or shape memory alloy (SMA) components such as nitonal springs 420 in FIG. 4b.

In other embodiments, as illustrated in FIG. 4c, thermal valve 310 can be electrically actuated based on one outputs of one or more fuel temperature sensors. Main fuel temperature is conventionally sensed downstream of main stage pump 208, at temperature sensor 222, and can be used for this purpose in addition to other functions. Alternatively and/or additionally, additional fuel temperature sensors can be provided upstream of heat exchanger 204 (temperature sensor 322a) or downstream of filter 206 (temperature sensor 322b) to more closely measure temperature from the two potential inputs to thermal valve 310—that is, sensing temperature downstream of heat exchanger 204 via temperature sensor 322b, and temperature from fuel bleed 218 (unheated by heat exchanger 204) via temperature sensor 322a. Electrically actuated versions of thermal valve 310 can, for example, be controlled electronically via a controller (which can, in some cases, be a component cooled by cooling plate 160 or heat exchanger 204) in response to sensor signals. Thermal valve 310c, depicted in FIG. 3c, illustrates one example of an electrically actuated valve using a high stroke solenoid actuator with displacement rod 430 driven by solenoid 440.

The various configurations of thermal valve 310 presented herein can be used to pick cooling modes so as to avoid flow of fuel into cooling plate 160 at undesirable temperatures This is accomplished by switching between fuel input from fuel bleed 218 immediately downstream of boost stage pump 202 (hereafter referred to as boost fuel) and fuel output from heat exchanger 204 diverted away from main stage pump 208 (hereinafter referred to as HEX fuel) as a function of temperature sensed at or passively corresponding to locations of temperature sensors 322a and/or 322b.

In one illustrated example, valve 310a can passively select HEX fuel so long as HEX fuel temperature remains below an overheat threshold temperature (e.g. 135-165° F.), and boost fuel otherwise. In electrically actuated equivalents to valve 310a, actuation of valve 310a can be responsive to sensed temperature at temperature sensor 322b. This overheat threshold temperature can be selected to ensure that cooling fuel provided to cooling plate 160 remains is sufficiently cool to enable necessary heat dissipation; specific values are only illustrative, and can depend on specific thermal tolerances of heat-sensitive component 214. So long as HEX fuel is sufficiently cool, cooling plate 160 can advantageously be provided with fuel filtered through filter 206. Furthermore, pre-heating of fuel by heat exchanger 204 en route to thermal valve 310 can obviate fuel icing concerns, even where the fuel is not conditioned with anti-icers.

In another illustrated example, valve 310b can passive select boost fuel so long as boost fuel remains above an anti-icing threshold temperature (e.g., 40-65° F.), and HEX fuel otherwise, to ensure obviate icing concerns with fuel entering cooling plate 160. This approach closely resembles the approach described above with respect to valve 310a, but prefers more efficient cooling use the colder boost fuel across a wider temperature range, at the cost of omitting filtration of fuel provided to cooling plate 160 in such cases. In electrically actuated equivalents to valve 310b, actuation of valve 310b can be responsive to sensed temperature at temperature sensor 322a.

In a further illustrated example, valve 310c is electrically controlled between boost and HEX fuel input. Valve 310c can be actuated according to rules as described above with respect to valves 310a or 310b (FIGS. 3a, 3b), but can be controlled based on temperatures at any of temperature sensors 222, 322a, and/or 322b. In some embodiments, valve 310c can be actuated based on comparison of the overheat and/or anti-icing threshold temperature to an estimated fuel temperature (i.e., corresponding to a location of temperature sensors 322a and/or 322b in FIG. 3), for example based on sensed main fuel temperature at temperature sensor 222. Estimated fuel temperature can be calculated based on known heat loads on heat exchanger 204, and/or model-based prediction of heating through main stage pump 208.

Figure 5:
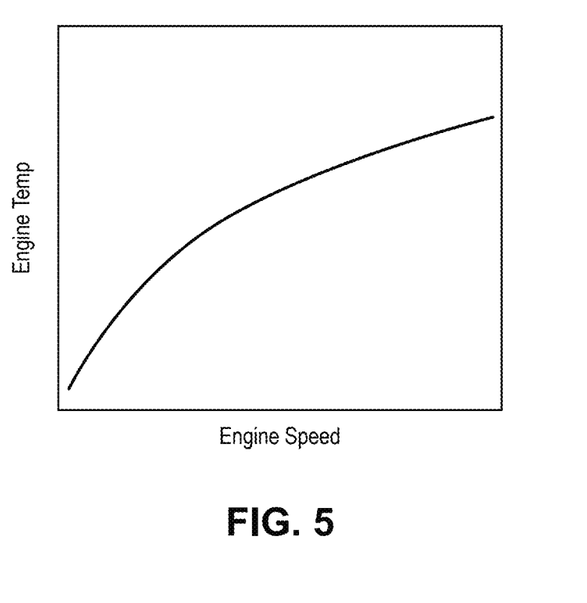
FIG. 5 is a plot of engine temperature as a function of engine speed, in a simplified example case.

Cooling systems 200 and 300 provide cooling for heat-sensitive components that generally scales with engine temperature, and therefore with cooling need. FIG. 5 provides an illustrative plot of engine temperature as a function of engine speed. Speed of boost stage pump 202 is generally dependent upon and proportional to engine speed, with resulting pump pressure (i.e., boost pressure) proportional to the square of pump speed. Hotter conditions in hot region 140 therefore generally correspond to higher cooling flow through, and heat dissipation from, cooling plate 160.

Cooling system 300, including versions of cooling system 300 with any of thermal valves 310a-c, enables fuel temperature-based selection of cooling fluid to avoid fuel icing and overheating.

Discussion of Possible Embodiments

The following are non-exclusive descriptions of possible embodiments of the present invention.

A cooling system for a gas turbine engine, the cooling system comprising: a fuel supply system comprising: a boost stage pump disposed to receive and pressurize fuel from a fuel source, with the pressurization increasing as a function of a speed of the gas turbine engine; a main stage pump disposed downstream of the boost stage pump, and configured to further pressurize the fuel for injection and subsequent combustion; and a fuel control system actuatable to control injection of fuel from the main stage pump into a combustor of the gas turbine engine; and a cooling fuel path comprising: a fuel bleed from an outlet of the boost stage pump, the fuel bleed located upstream of the main stage pump; a cooler fluidly connected to receive the fuel from the fuel bleed as cooling fluid; and a fuel return fluidly connecting a downstream side of the cooler to an inlet of the boost stage pump.

The cooling system of the preceding paragraph can optionally include, additionally and/or alternatively, any one or more of the following features, configurations and/or additional components:

A further embodiment of the foregoing cooling system, wherein the boost stage pump is a centrifugal pump with pump speed and consequently pump pressure dependent on the speed of the gas turbine engine.

A further embodiment of the foregoing cooling system, wherein the fuel supply system further comprises, downstream of the boost stage pump and upstream of the main stage pump: a debris filter; and a fuel heat exchanger disposed to use the fuel as a cooling fluid.

A further embodiment of the foregoing cooling system, further comprising a 3-way thermal valve disposed between the fuel bleed and the cooler, and having an input downstream of the fuel heat exchanger and the debris filter.

A further embodiment of the foregoing cooling system, wherein the 3-way thermal valve is operable between two modes: a first mode fluidly connecting the fuel bleed to the cooler, excluding the fuel heat exchanger; and a second mode disconnecting the fuel bleed from direct fluid communication with the cooler, and fluidly connecting the cooler to receive fuel output from the fuel heat exchanger.

A further embodiment of the foregoing cooling system, wherein the cooling fuel path further comprises a check valve disposed between the 3-way thermal valve and the main stage pump, to prevent fuel flow from the thermal valve to the main stage pump by bypassing the fuel heat exchanger and the filter.

A further embodiment of the foregoing cooling system, wherein actuation of the 3-way thermal valve between the two modes is based on a temperature of the fuel.

A further embodiment of the foregoing cooling system, wherein the 3-way thermal valve is a passive valve responsive to a temperature of fuel delivered to the 3-way thermal valve.

A further embodiment of the foregoing cooling system, wherein the 3-way thermal valve comprises a shape-memory alloy spring, a bimetallic disk stack, and/or a thermal wax.

A further embodiment of the foregoing cooling system, wherein the 3-way thermal valve is an electrically actuated valve controlled based on a temperature of the fuel.

A further embodiment of the foregoing cooling system, wherein the 3-way thermal valve is a solenoid valve.

A further embodiment of the foregoing cooling system, further comprising a fuel temperature sensor disposed along a path of fluid between the boost stage pump and the fuel control system to sense a fuel temperature.

A further embodiment of the foregoing cooling system, wherein the fuel temperature sensor is disposed downstream of the main stage pump.

A further embodiment of the foregoing cooling system, wherein the fuel temperature sensor is disposed upstream of the heat exchanger, downstream of the boost stage pressure pump.

A further embodiment of the foregoing cooling system, wherein the fuel temperature sensor is disposed downstream of the heat exchanger, upstream of the main stage pump.

A further embodiment of the foregoing cooling system, wherein the cooling system is configured to actuate the 3-way thermal valve based at least partially on the fuel temperature.

A further embodiment of the foregoing cooling system, wherein actuation of the 3-way thermal valve based on the temperature of the valve causes the 3-way thermal valve to operate in the second mode when the fuel temperature is below an overheat threshold temperature.

A further embodiment of the foregoing cooling system, wherein actuation of the 3-way thermal valve based on the temperature of the valve causes the 3-way thermal valve to operate in the second mode when the fuel temperature is above an anti-icing threshold temperature.

A further embodiment of the foregoing cooling system, further comprising an engine case, wherein the cooled plate is disposed to receive a heat sensitive component such that the cooled plate is disposed between and acts as a thermal barrier between the engine case and the heat sensitive component.

A further embodiment of the foregoing cooling system, the cooler has a low emissivity surface facing the engine case.

A further embodiment of the foregoing cooling system, further comprising an additional cooled component serially disposed downstream of the cooler, upstream of the fuel return.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cooling system for a gas turbine engine, the cooling system comprising:
a fuel supply system comprising:
a boost stage pump disposed to receive and pressurize a fuel from a fuel source, with the pressurization increasing as a function of a speed of the gas turbine engine;

a main stage pump disposed downstream of the boost stage pump, and configured to further pressurize a first portion of the fuel for injection and subsequent combustion;

a fuel control system actuatable to control injection of the first portion of the fuel from the main stage pump into a combustor of the gas turbine engine; and a fuel heat exchanger disposed to use the first portion of the fuel as a first cooling fluid; and a cooling fuel path comprising:
  a fuel bleed from an outlet of the boost stage pump, the fuel bleed located upstream of the main stage pump;
  a cooler fluidly connected to receive a second portion of the fuel from the fuel bleed as a second cooling fluid;
  a fuel return fluidly connecting a downstream side of the cooler to an inlet of the boost stage pump; and
  a 3-way thermal valve disposed between the fuel bleed and the cooler, and having an input downstream of the fuel heat exchanger,
  wherein the 3-way thermal valve is operable between two modes:
    a first mode fluidly connecting the fuel bleed to the cooler, excluding the fuel heat exchanger; and
    a second mode disconnecting the fuel bleed from direct fluid communication with the cooler, and fluidly connecting the cooler to receive at least a portion of the second portion of the fuel output from the fuel heat exchanger.

2. The cooling system of claim 1, wherein the boost stage pump is a centrifugal pump with pump speed and consequently pump pressure dependent on the speed of the gas turbine engine.

3. The cooling system of claim 1, wherein the fuel supply system further comprises a debris filter, and wherein the debris filter and the fuel heat exchanger are situated downstream of the boost stage pump and upstream of the main stage pump.

4. The cooling system of claim 3, wherein the input of the 3-way thermal valve is disposed downstream of the debris filter.

5. The cooling system of claim 1, wherein the cooling fuel path further comprises a check valve disposed between the 3-way thermal valve and the main stage pump, to prevent the at least a portion of the second portion of the fuel flow from the 3-way thermal valve to the main stage pump by bypassing the fuel heat exchanger and a debris filter.

6. The cooling system of claim 1, wherein actuation of the 3-way thermal valve between the two modes is based on a temperature of at least one of the first portion of the fuel and the at least a portion of the second portion of the fuel.

7. The cooling system of claim 6, wherein the 3-way thermal valve is a passive valve responsive to the temperature of at least one of the first portion of the fuel and the at least a portion of the second portion of the fuel delivered to the 3-way thermal valve.

8. The cooling system of claim 7, wherein the 3-way thermal valve comprises a shape-memory alloy spring, a bimetallic disk stack, and/or a thermal wax.

9. The cooling system of claim 6, wherein the 3-way thermal valve is an electrically actuated valve controlled based on the temperature of at least one of the first portion of the fuel and the at least a portion of the second portion of the fuel.

10. The cooling system of claim 9, further comprising a fuel temperature sensor disposed along a fluid path of fluid between the boost stage pump and the fuel control system to sense a fuel temperature indicating at least one of the first portion of the fuel and the at least a portion of the second portion of the fuel.

11. The cooling system of claim 10, wherein the fuel temperature sensor is disposed downstream of the main stage pump.

12. The cooling system of claim 10, wherein the fuel temperature sensor is disposed upstream of the fuel heat exchanger, downstream of the boost stage pressure pump.

13. The cooling system of claim 10, wherein the fuel temperature sensor is disposed downstream of the fuel heat exchanger, upstream of the main stage pump.

14. The cooling system of claim 6, wherein the actuation of the 3-way thermal valve based on the temperature of at least one of the first portion of the fuel and the at least a portion of the second portion of the fuel further comprising: causing the valve causes the 3-way thermal valve to operate in the second mode when the fuel temperature of the at least a portion of the second portion of the fuel is below an overheat threshold temperature.

15. The cooling system of claim 6, wherein the actuation of the 3-way thermal valve based on the temperature of at least one of the first portion of the fuel and the at least a portion of the second portion of the fuel further comprising: causing the valve causes the 3-way thermal valve to operate in the first mode when the fuel temperature of the first portion of the fuel is above an anti-icing threshold temperature.

16. The cooling system of claim 1, further comprising an additional cooled component serially disposed downstream of the cooler, upstream of the fuel return.

* * * * *